United States Patent
Ashour et al.

(10) Patent No.: US 12,450,434 B1
(45) Date of Patent: Oct. 21, 2025

(54) NEURAL NETWORK BASED DETERMINATION OF EVIDENCE RELEVANT FOR ANSWERING NATURAL LANGUAGE QUESTIONS

(71) Applicant: Humana Inc., Louisville, KY (US)

(72) Inventors: Ayman Ashour, Louisville, KY (US); Tiffany Fair Shaffer, Greenville, IN (US); Gregory F. Hayworth, Louisville, KY (US)

(73) Assignee: Humana Inc., Louisville, KY (US)

(*) Notice: Subject to any disclaimer, the term of this patent is extended or adjusted under 35 U.S.C. 154(b) by 323 days.

(21) Appl. No.: 17/504,026

(22) Filed: Oct. 18, 2021

(51) Int. Cl.
*G06F 40/289* (2020.01)
*G06V 30/10* (2022.01)

(52) U.S. Cl.
CPC .......... *G06F 40/289* (2020.01); *G06V 30/10* (2022.01)

(58) Field of Classification Search
CPC .................................................. G06F 40/289
See application file for complete search history.

(56) References Cited

U.S. PATENT DOCUMENTS

| | | | |
|---|---|---|---|
| 8,832,064 B2* | 9/2014 | Stenchikova | G06F 16/243 707/739 |
| 9,703,861 B2* | 7/2017 | Brown | G06F 16/3344 |
| 2021/0090691 A1* | 3/2021 | McNeil | G16H 10/60 |
| 2021/0157857 A1* | 5/2021 | Nogueira Dos Santos | G06N 20/00 |
| 2021/0201266 A1* | 7/2021 | Wang | G06V 30/32 |
| 2021/0390127 A1* | 12/2021 | Fox | G06F 40/289 |

* cited by examiner

*Primary Examiner* — Bhavesh M Mehta
*Assistant Examiner* — Nandini Subramani
(74) *Attorney, Agent, or Firm* — Standley Law Group LLP; Jeffrey S. Standley; James L. Kwak

(57) ABSTRACT

A system makes evidence-based decision for actions associated with a user. The system receives information describing an action associated with the user. The system receives documents associated with the user and questions associated with the action. For each of the plurality of questions the system performs the following steps. The system evaluates sentences from the document in relation to the question using an evidence extraction model. The system classifies the evidence using an evidence classification model to determine whether the evidence refutes or supports a decision based on the question. The system makes a decision regarding the action based on the classifications of evidence sentences in relation to each of the plurality of questions. The evidence extraction model and the evidence classification model are trained neural networks.

20 Claims, 6 Drawing Sheets

560

NEURAL NETWORK BASED DETERMINATION OF EVIDENCE RELEVANT FOR ANSWERING NATURAL LANGUAGE QUESTIONS

FIELD OF INVENTION

The disclosure relates to machine learning based models for natural language processing in general and more specifically to using machine learning based techniques for determining evidence relevant to answering natural language questions.

BACKGROUND

Question answering (QA) concerns systems that automatically answer questions posed by users. A question answering system may construct answers to questions by querying a structured database of knowledge or information, for example, a collection of reference texts, new reports, Wikipedia pages, or any collection of web pages. Techniques for question answering include extractive question answering that uses machine learning based models for extracting answers to questions from a corpus of information such as Wikipedia; narrative question answering, for example, using neural networks for answering questions in the context of a narrative; or answering techniques that select an answer from multiple choices or return a Boolean answer. These techniques are typically designed for answering arbitrary natural language questions. These techniques are not very effective in answering questions for specific domains. For example, certain domains require answering questions in view of a specific guidelines. These techniques fail to provide accurate answers in such domain specific applications.

SUMMARY

A system makes evidence-based decision for performing actions associated with a user. The system receives information describing an action associated with the user. The system receives a set of documents associated with the user, for example, records describing user information or actions performed by the user. The system also receives questions associated with the action. The questions may represent domain specific guidelines that help make the decision.

For each question the system performs the following steps. For each document from the set of documents, the system evaluates sentences from the document in relation to the question using an evidence extraction model. In an embodiment, the evidence extraction model is a trained neural network configured to receive as input a question and a potential evidence sentence and output a score indicating whether the potential evidence sentence represents evidence relevant to the question. The system identifies a set of evidence sentences from the document based on the scores output by the evidence extraction model.

The system classifies the set of evidence sentences in relation to the question using an evidence classification model. The evidence classification model is a trained neural network configured to receive as input a question and the set of evidence sentences and output a classification of the input evidence sentences indicating whether the set of evidence sentences support or refute an answer to the input question. The system makes a decision regarding the action based on the classifications of evidence sentences in relation to the questions.

The features and advantages described in the specification are not all inclusive and in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the disclosed subject matter.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

DETAILED DESCRIPTION

A system according to an embodiment makes decisions related to user actions in view of predefined guidelines. The system receives questions that may be based on natural language. The system answers the questions based on a corpus information associated with the user, for example, a set of documents. The set of documents may represent records describing the user including user profile information, information describing actions performed by the user in the past, and historical information describing the user for example, changes in user information over time. The system extracts evidence relevant to the questions from the set of documents. The system classifies the evidence sentences relevant to a question based on whether the evidence supports or refutes a particular answer to a question. The system uses the classification of the evidence sentences to make a decision regarding the user action. The decision regarding the user action may be used to automatically route information relevant to the user action to a user, for example, an expert user.

Overall System Environment

Figure 1:
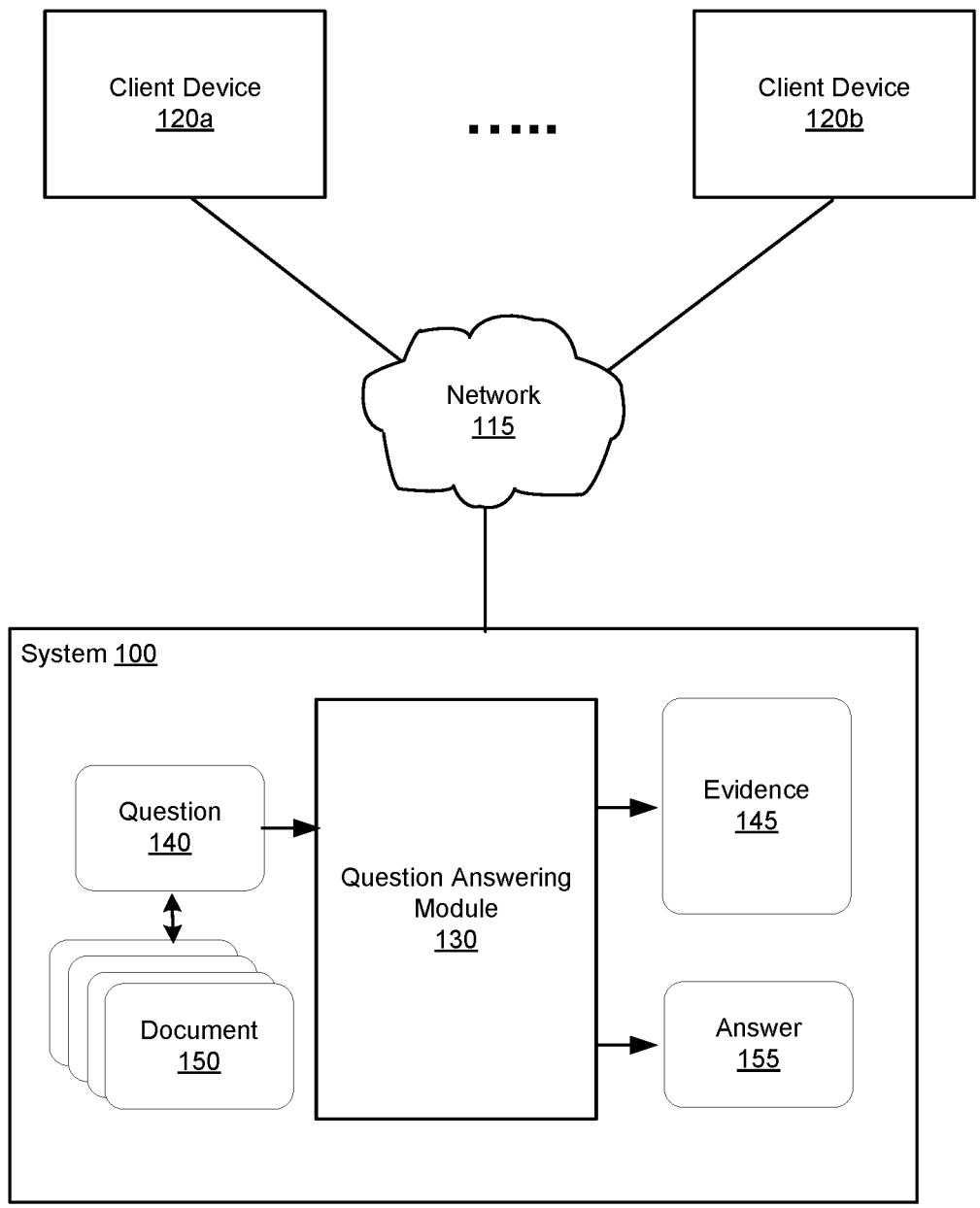
FIG. 1 shows the overall system environment of a system configured to perform evidence-based question answering, according to an embodiment.

FIG. 1 shows the overall system environment of a system configured to perform evidence-based question answering, according to an embodiment. The overall system environment 110 includes a system 100, a network 115, and one or more client devices 120. The client devices interact with the system 100 via the network 115 to send questions to the system and receive answers determined by the system for the questions. In other embodiments, more or fewer systems/components than those indicated in FIG. 1 may be used. A user may interact with the system 100 via the client device 120 through the network 115. Furthermore, there may be more or less instances of each system shown in FIG. 1, such as the client devices 120a, 120b, and so on.

The system 100 includes a question answering module 130. The system 100 receives questions 140 from the client devices. The system 100 generates answers 155 to the questions and also provides evidence 145 associated with the questions. The evidence may be extracted from a corpus of information, for example, the set of documents 150. The system 100 may receive the documents 150 from a local data store or from another external system. In an embodiment, the system 100 configures a user interface via an application running on the client device 120. Users of the application may use the user interface to provide questions and receive and review answers and the associated evidence. The users may review the evidence to determine whether to take a particular action based on the answer. For certain applications the user may receive guidelines to determine whether to take certain action in view of the evidence and the answer. The question answering module 130 extracts evidence that supports an answer for a question.

The client device 120 used by a user for interacting with the online system 100 can be a personal computer (PC), a desktop computer, a laptop computer, a notebook, a tablet PC executing an operating system, for example, a Microsoft Windows®-compatible operating system (OS), Apple OS X®, and/or a Linux distribution. In another embodiment, the client device 120 can be any device having computer functionality, such as a personal digital assistant (PDA), mobile telephone, smartphone, wearable device, etc.

The interactions between the client devices 120 and the system 100 are typically performed via network 115, for example, via the Internet. The network enables communications between the client device 120 and the online system 100. In one embodiment, the network 115 uses standard communications technologies and/or protocols. The data exchanged over the network can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 115 can also include links to other networks such as the Internet.

FIG. 1 and the other figures use like reference numerals to identify like elements. A letter after a reference numeral, such as "120a," indicates that the text refers specifically to the element having that particular reference numeral. A reference numeral in the text without a following letter, such as "120," refers to any or all of the elements in the figures bearing that reference numeral (e.g. "120" in the text refers to reference numerals "120a" and/or "120b" in the figures).

System Architecture

Figure 2:
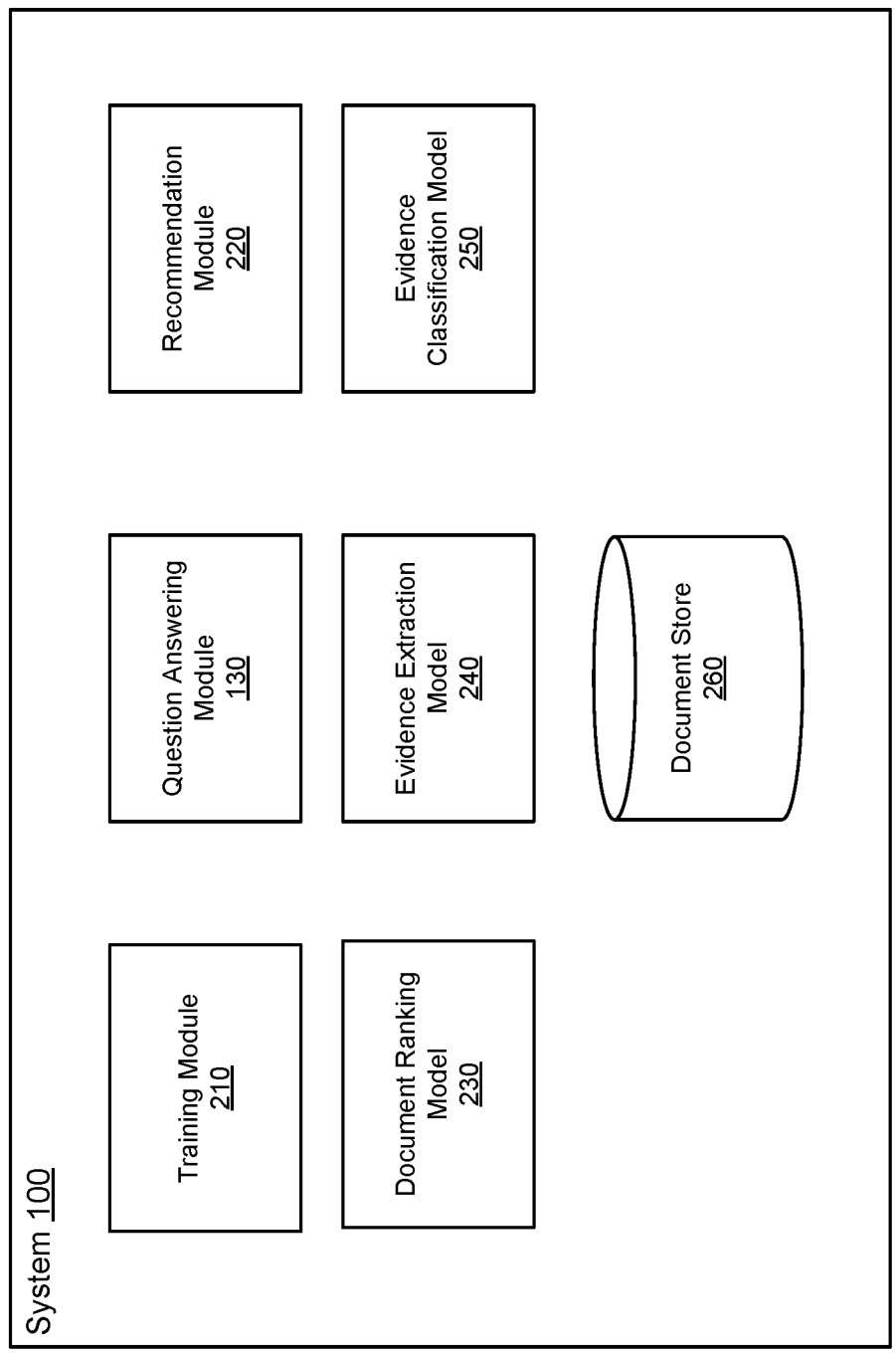
FIG. 2 shows the system architecture of the system configured to perform evidence-based question answering, according to an embodiment.

FIG. 2 shows the system architecture of the system configured to perform evidence-based question answering, according to an embodiment. The system 100 comprises a training module 210, a question answering module 130, recommendation module 220, a document ranking model 230, an evidence extraction model 240, an evidence classification model 250, and a document store 260. Other embodiments may include other modules. Actions indicated as being performed by a particular module may be performed by other modules than those indicated herein.

The document store 260 stores documents associated with users that are used for extracting evidence associated with answers to questions. In an embodiment, the document store 260 stores records describing users, for example, records describing historical information about users seeking treatments from a healthcare facility. The document store 260 may store documents storing information used for extracting evidence. In an embodiment, the system 100 receives information in the form of documents describing a user that may be received via fax. The documents received via fax are stored as images. The system 100 performs optical character recognition (OCR) on the images to extract textual representation of the documents.

The question answering module 130 perform natural language processing to analyze documents associated with a user and extract evidence from the documents. The question answering module 130 executes the various machine learning models of the system 100 to generate evidence-based answers to questions associated with users. The question answering module 130 provides the evidence-based answers to the recommendation module 220. The recommendation module 220 recommends a course of action to be take in view of certain situation of the user. In some embodiments, the questions are received as domain specific guidelines that represent criteria to be evaluated in a particular situation associated with a user to extract evidence relevant to the situation for the user. For example, if the system 100 is used for healthcare applications, the recommendation module 220 may determine whether a treatment for a person or a claim filed by a person should be approved or denied. The system 100 receives guidelines that represent evidence that is reviewed for each particular situation. For example, the guidelines may identify specific evidence that should be reviewed if a user need treatment for a specific condition. The evidence may represent specific user profile attributes or conditions, specific behavior attributes of the user, health history of the user, specific actions taken by the user in the past, or specific treatments administered to the user in the past.

The document ranking model 230 evaluates a set of documents associated with a question. The question is used to make a decision regarding a particular action for the user. The question represents a criterion based on predefined guidelines that may be domain specific and help make a decision regarding the action. The question answering module 130 uses the ranking generated by the document ranking model 230 to filter out documents that are not likely to include evidence associated with a question. The filtering of documents helps improve efficiency of evaluating the course of action to be taken in a particular situation for a user. In an embodiment, the question answering module 130 creates an index using the documents associated with the user. The index includes documents that have score generated by the document ranking model 230 that is above a threshold value indicating more than a threshold likelihood that the document includes evidence associated with the question. The threshold value is a configurable parameter. The question answering module 130 uses the index for extracting evidence associated with the user in view of the question. The index provides efficient access to relevant documents.

According to an embodiment, the document ranking model 230 is a neural network based model. The document ranking model 230 ranks the documents according to the questions that have a high likelihood of being encountered by the system. For example, if the system determines that there is a set of N (say 10) questions that are likely to be encountered for certain use case, the system ranks the pages against each question then takes an aggregate score based on the scores of each of the set of questions. For example, the system may determine an average of the scores for each of the questions from the set.

Figure 3:
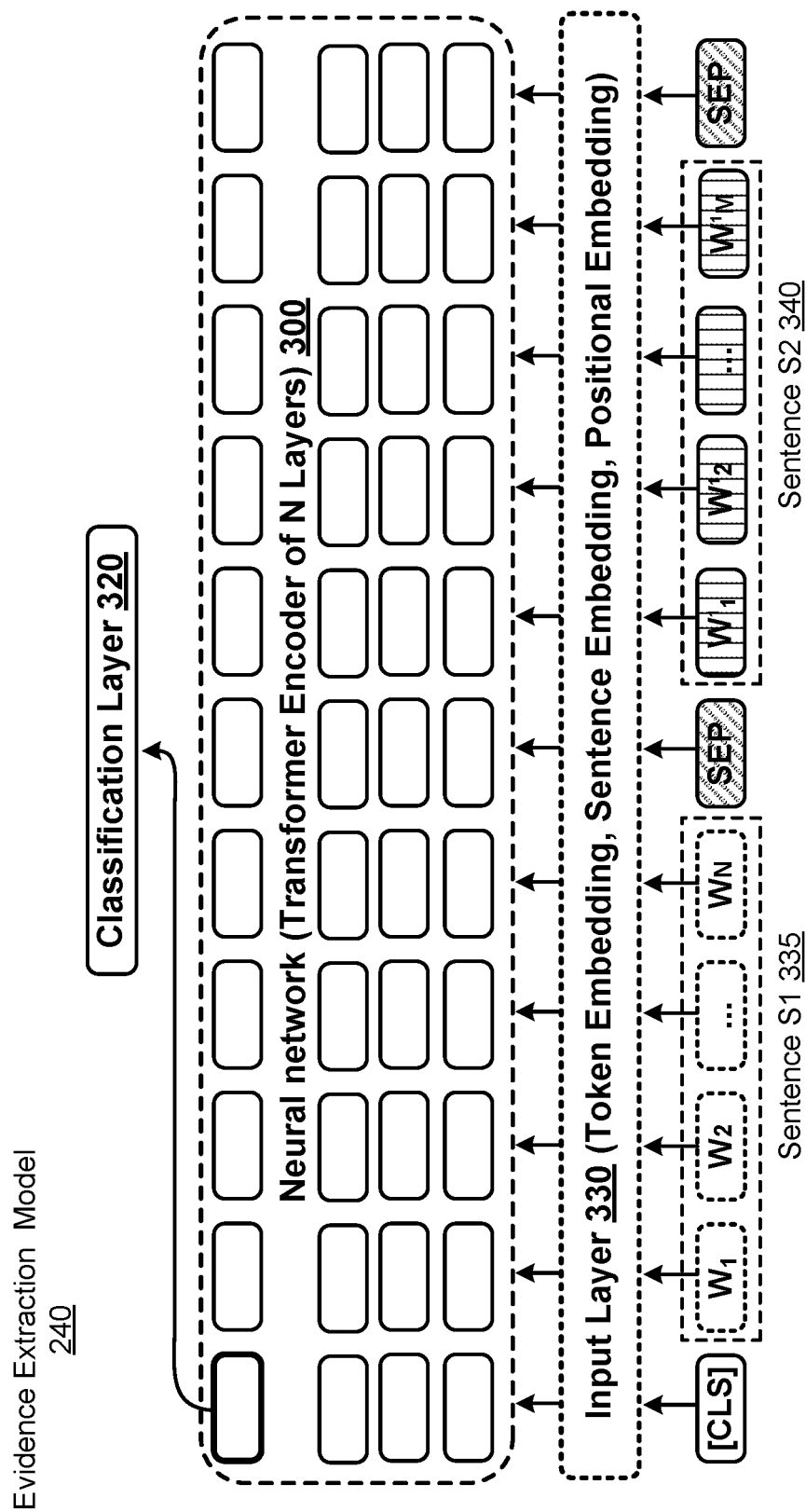
FIG. 3 shows the architecture of an evidence extraction model for extracting evidence associated with a question, according to an embodiment.

The evidence extraction model 240 extracts evidence associated with a decision associated with an action corresponding to a user from a set of documents. An example of an action is approving a claim associated with the user, for example, a medical claim. The evidence may be represented as a portion of a document that may include one or more adjacent sentences of the document. The document may represent a form filled out by the user and the evidence may represent answer to a particular question filled out by the user. Details of the evidence extraction model 240 are illustrated in FIG. 3 and the described in connection with FIG. 3.

Figure 4:
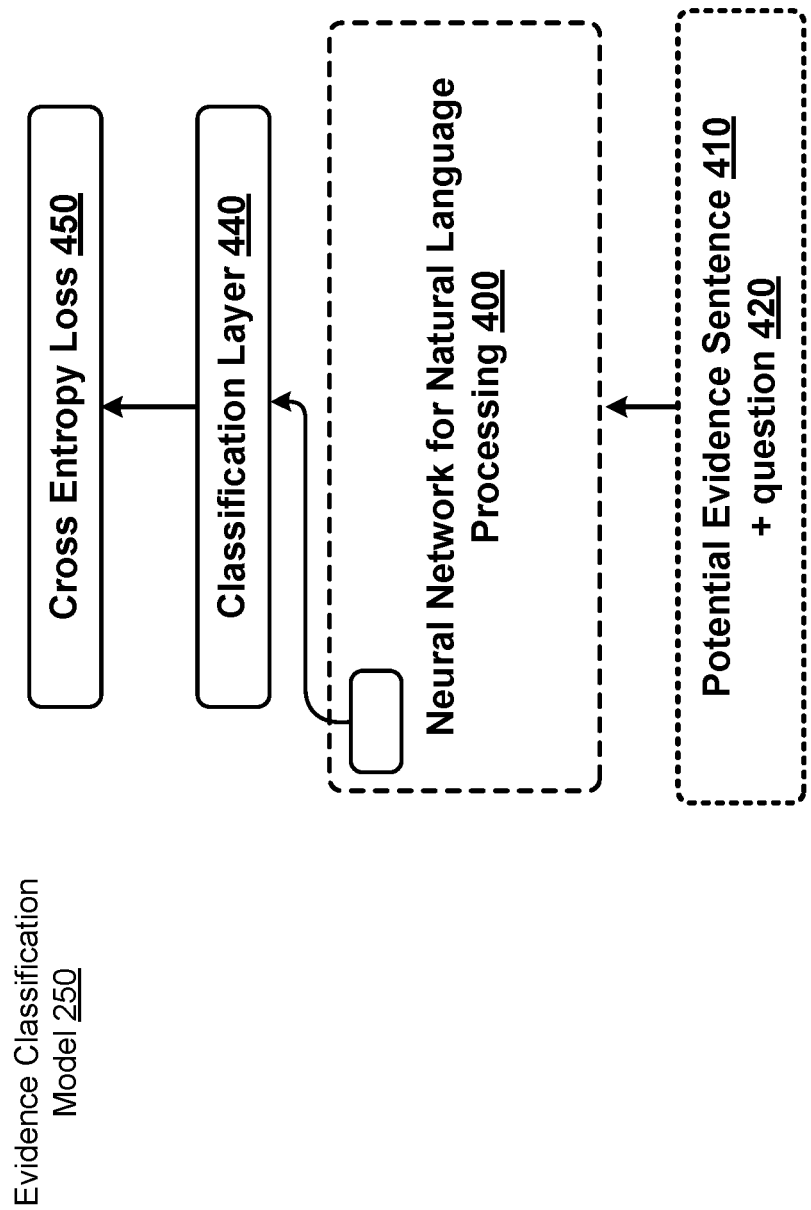
FIG. 4 shows the architecture of an evidence classification model for classifying evidence in connection with a question, according to an embodiment.

The evidence classification model 250 determines a relation between evidence and a particular decision associated with a user, for example, whether particular action should be performed, whether a claim should be approved, and so on. For example, the evidence classification model 250 classifies the evidence in view of a decision as indicating whether the evidence refutes the decision, supports the answer to the decision, or there is not enough information in the evidence to make any determination in connection with the decision. The evidence classification model 250 may determine a relation between evidence and a particular answer to a question, for example, a question representing a guideline for making a decision. For example, the evidence classification model 250 classifies the evidence in view of an answer to a question as indicating whether the evidence refutes the answer, supports the answer, or there is not enough information in the evidence to make any determination in connection with the answer. Details of the evidence classification model 250 are illustrated in FIG. 4 and the described in connection with FIG. 4.

The training module 210 trains the different models used by the question answering module 130 including the document ranking model 230, the evidence extraction model 240, and the evidence classification model 250. In an embodiment, the training module 210 performs pretraining based on a large corpus of documents that are obtained from a broad field, followed by retraining based on documents that are more domain specific. In an embodiment, the training module 210 trains the evidence extraction model 240 using training data set that represents ground truth obtained from experts and identifies evidence sentences from a set of documents corresponding to specific questions. The training module 210 adjusts parameters of the evidence classification model 250, so as to minimize certain loss function based on predicted values and actual values according to the ground truth.

In some embodiments, the training module 210 performs joint training of the evidence extraction model 240 and the evidence classification model 250. Accordingly, the training module 210 provides the training data to the evidence extraction model 240 and provides the output generated by the evidence extraction model 240 to the evidence classification model 250 and minimizes the loss representing a difference between the prediction of the evidence classification model 250 and the actual labels of the training data. The training module 210 adjusts the parameters of both evidence extraction model 240 and the evidence classification model 250 to minimize the loss. This results in joint training of both evidence extraction model 240 and the evidence classification model 250.

According to an embodiment, the models including the evidence extraction model and the evidence classification model are neural networks configured to process natural language sentences. The models may be bidirectional encoder representations from transformers based on semi-supervised learning. The models may be implemented as an encoder stack of transformer architecture, wherein the transformer architecture is an encoder-decoder network that uses self-attention on the encoder side and attention on the decoder side. Accordingly, the models are trained to perform next sentence prediction (NSP) by determining whether certain observed document segments come from the same or distinct documents based on an auxiliary next sentence prediction loss.

FIG. 3 shows the architecture of an evidence extraction model for extracting evidence associated with a question, according to an embodiment. The question is associated with an action, for example, a decision to be made in a particular context for a user. According to an embodiment, the evidence extraction model 240 is a neural network 300 for natural language processing that is configured to receive as input: (1) a question 335 represented as sentence S1 (1) a portion of a document 340, for example, a potential evidence sentence S2. The inputs may be concatenated to form a single input string. The various portions of the input string obtained by concatenating the different input components are separated by separators, for example, marker strings or marker characters. The evidence extraction model 240 outputs a propensity score indicating whether the portion of the document received as input represents evidence relevant to the question.

In an embodiment, the neural network 300 is a masked language model that has multiple layers, for example, a transformer encoder with N layers. The last layer of the neural network 400 is a classification layer 320 that outputs the result of the classification indicating whether the input sentence represents evidence for the input question.

The input layer 330 may use embeddings representing feature vector representations of input values. The embeddings may be generated by another neural network, for example, an encoder-decoder neural network that regenerates the input values and transforms the input values to a feature vector that is lower dimensional compared to the input. The lower dimensional feature vector representation may be used as the embeddings representing the input. The embeddings provided as input to the neural network 300 may be generated at token level or sentence level. In an embodiment, positional embeddings are used that encode positions of various components of the input, for example a matrix encoding positions of various input tokens or position of the input question and position of the input potential evidence sentence.

The input question is associated with an action associated with a user, for example, an action representing an approval of a claim. In an embodiment, the action is associated a category of actions, for example, category representing a type of action or a type of context based on the attributes of the user. Each category of action is associated with a set of predefined questions. For example, the system 100 may receive guidelines associating a set of questions for each category of actions. The system accesses the set of questions associated with a category of action and collects evidence relevant to the action to determine whether to perform the action or not. The evidence extraction model 240 is used for extracting evidence that helps determine whether to perform an action associated with the user, for example, to make a decision regarding a particular situation associated with the user. An example of an action is approving a claim for a user representing approval to make payments for a treatment for a user.

The portion of the document provided as input to the evidence extraction model may represent a single potential evidence sentence extracted from the document or a phrase extracted from the document. The portion of the document may represent multiple potential evidence sentences extracted from the document. The document may represent a form filed out by the user and a portion of the document may be an answer to a question provided by the user while filling out the form.

According to an embodiment, the evidence extraction model 240 is a binary classifier that returns a yes/no answer indicating whether the input portion of document represents evidence relevant to the input question or not. The question answering module 130 invoke the evidence extraction model 240 for a particular question, for different portions of a document to determine which portions of the document represent evidence relevant to the question. The question answering module 130 invokes the evidence extraction model 240 for each question associated with an action. The question answering module 130 uses the outputs determined by the evidence extraction model 240 for the set of questions and evidence sentences to determine whether the action should be performed or not.

FIG. 4 shows the architecture of an evidence classification model for classifying evidence in connection with a question, according to an embodiment. The evidence classification model may be a neural network 400 for processing natural language input. In an embodiment, the neural network 400 is a pairwise multi-class classifier that receives as input: (1) a question 420 associated with an action to be performed in connection with a user and (2) one or more sentences 410 identified as evidence for the question and outputs a label representing a relation between the sentences identified as evidence and the question. The neural network 400 may be a transformer encoder with multiple layers such that the last layer is a classification layer 440. The training module 210 determines a cross entropy loss 450 based on predictions of the neural network 400 made for training dataset. The one or more sentences identified as evidence for the question may be determined using the evidence extraction model 240 and are referred to as evidence sentences. According to an embodiment, the questions are Boolean questions that have two possible answers. For example, the answers may be one of TRUE or FALSE. Alternatively, the answer may be one of SUPPORT/REFUTE.

The output label value corresponds to the question. For example, the output label value 'SUPPORT' indicates that the input evidence sentences indicates that the action should be performed, output label value 'REFUTE' indicates that the input evidence sentences indicates that the action should not be performed, and output label value 'NOT ENOUGH INFO' indicates that the input evidence sentences do not provide enough information to determine whether or not to perform the action. Accordingly, the output label value may correspond to a decision associated with the action, the decision indicating whether the action should be performed or not performed. For example, the action may represent approving a claim filed by a user. The output label value 'SUPPORT' indicates that the input evidence sentences indicates that the claim should be approved, output label value 'REFUTE' indicates that the input evidence sentences indicates that the claim should not be approved, and output label value 'NOT ENOUGH INFO' indicates that the input evidence sentences do not provide enough information to determine whether or not to approve the claim.

The output of the evidence classification model may be a label that takes one of the following values: 'SUPPORT,' 'REFUTE,' or 'NOT ENOUGH INFO.' The output label value 'SUPPORT' indicates that the input evidence sentences support a particular answer to the input question, for example, true answer. The output label value 'REFUTE' indicates that the input evidence sentences refute a particular answer to the input question. The output label value 'NOT ENOUGH INFO' indicates that the input evidence sentences do not provide enough information to either support or refute a particular answer to the input question.

Overall Process

Figure 5:
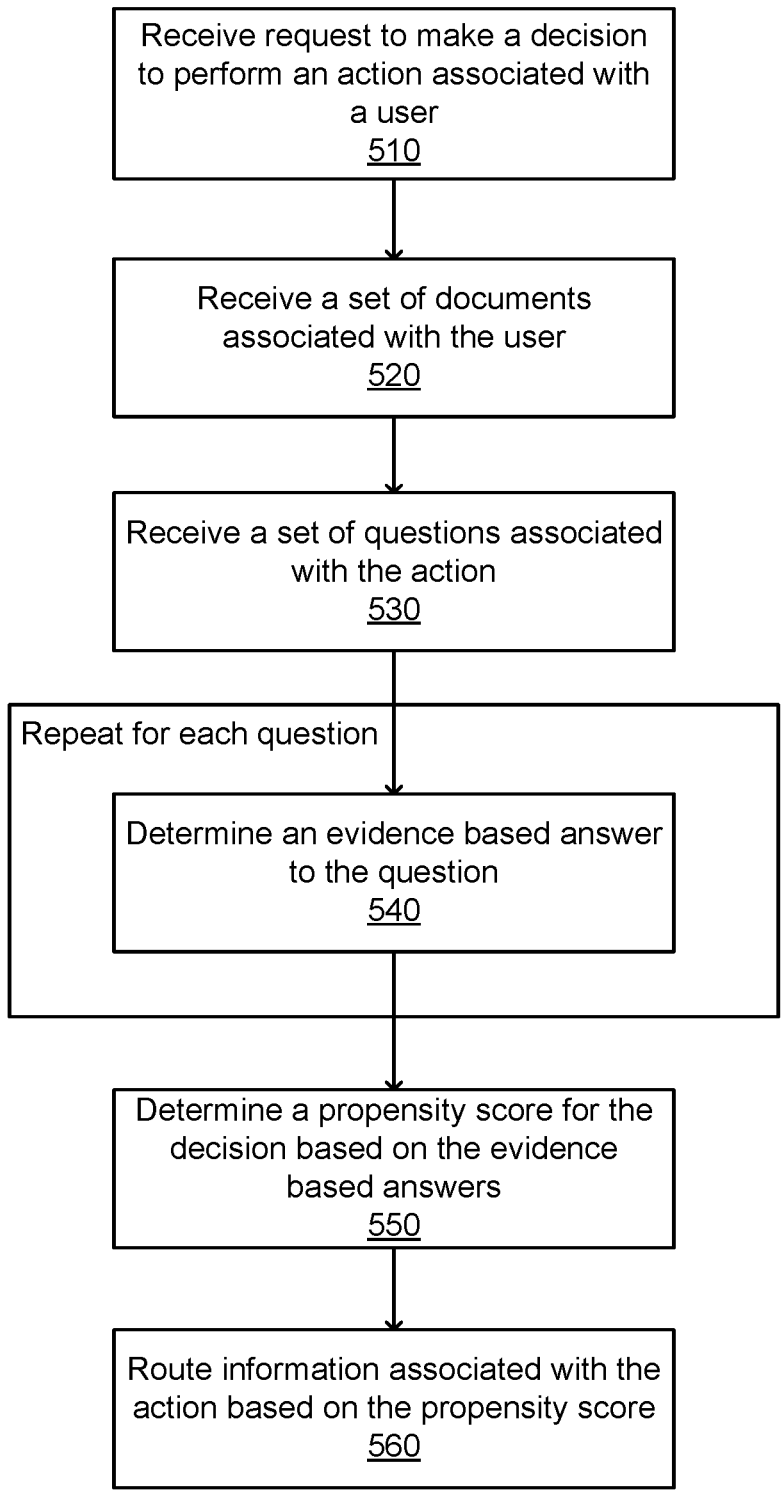
FIG. 5 shows a flowchart illustrating the process for evaluating a decision regarding a particular action to be taken in a particular situation associated with a user, according to an embodiment.

FIG. 5 shows a flowchart illustrating the process for evaluating a decision regarding a particular action to be taken in a particular situation associated with a user, according to an embodiment. The steps described herein may be performed by modules other than those described herein. Furthermore, the steps may be performed in an order different from that shown herein, for example, certain steps may be performed in parallel.

The system 100 receives 510 a request to make a decision associated with a user. The decision may be whether or not to take a particular action for the user. For example, if a claim is received for a user, the decision may be to determine whether to approve the claim or deny the claim. The claim may be a health-related claim or any insurance related claim, for example, related to a vehicle. The decision may be whether to grant a particular access to the user, whether to change the status of a user for example, by promoting or demoting the user, and so on.

The system receives 520 a set of documents associated with the user or associated with a particular situation regarding which a decision has to be made. The system also receives 530 a set of questions associated with the action. The questions act as guidelines for making the specific decision. The documents are expected to include information that acts as evidence for making the decision. A question may also be represented as a criterion that should be satisfied by a sentence to be considered evidence in connection with the decision.

The system performs the following step 540 for each question. The system determines 540 evidence relevant to the question using various machine learning based models described herein. The details of the process for determining 540 evidence-based answer to a question are illustrated in FIG. 6 and described in connection with the FIG. 6.

The system makes 550 a decision based on the evidence-relevant to the questions associated with the action. The system takes certain steps towards the action based on the decision. For example, the system may route information associated with the action to the appropriate user based on the decision. For example, for an action representing an approval of a claim for a health care related issue, the system may route 560 the information to a nurse or a physician based on the decision. In an embodiment, the system automatically performs an action based on the decision, for example, the system may automatically approve a claim if the amount claimed is below a threshold value.

Figure 6:
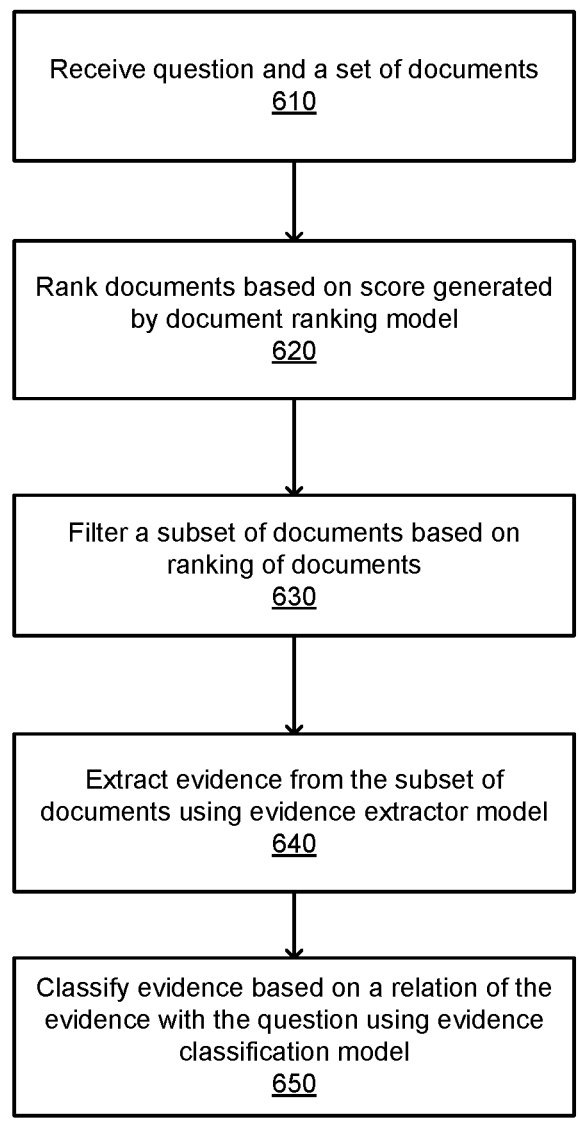
FIG. 6 shows a flowchart illustrating the process for evidence-based answering of a question, according to an embodiment.

FIG. 6 shows a flowchart illustrating the process for evidence-based answering of a question, according to an embodiment. The steps represent details of the step 540 shown in FIG. 5 that concerns determining evidence relevant to a question. The steps described herein may be performed by modules other than those described herein. Furthermore, the steps may be performed in an order different from that shown herein, for example, certain steps may be performed in parallel.

The system receives 610 a question and a set of documents. The provides the question and the documents to the document ranking model 230 to determine a score for ranking the documents in relation to the question. The system ranks 620 the documents based on the score determined by the document ranking model 230. The system filters 630 the documents from the set to determine a subset of documents that are likely to include evidence relevant to the question.

The system extracts 640 evidence from the subset of documents using the evidence extraction model 240. The system may extract one or more evidence sentences from each document from the subset. The system classifies 650 the evidence extracted using the evidence classification model 250, for example, by associating the evidence with labels such as "SUPPORT,' 'REFUTE,' or 'NOT ENOUGH INFO." The evidence sentences and the classification of the evidence sentences are used to make the decision for the particular action associated with the user.

The techniques disclosed herein may be used for determining evidence relevant to making a decision associated with an action for the user and providing the evidence to a user to make a decision. The extracted evidence may be displayed via a user interface to an expert user and tagged with the appropriate classification. Examples of expert users depend on the domain, for example, for healthcare domain, the expert user may be a nurse or a physician that makes a decision related to treatment of a user or a decision regarding processing of a claim submitted by the user. The evidence and the classification of the evidence may be used for routing information to the appropriate expert user. For example, the information may be routed to a user U1 if the evidence is determined to support a decision and to another user U2 if the evidence is determined to refute the decision.

Evidence based questions answering may be used in various domains including health care, legal research, scientific research, and so on. For example, for healthcare systems, an expert such as a nurse may review the evidence to determine whether to approve certain treatment for a person. The techniques disclosed help with utilization management by providing the required information to allow experts to make informed decision about specific user situations, for example, whether a particular medication should be approved for a patient, whether a case should be referred to a specialist, and so on. The actions taken based on an answer and supporting evidence result in various costs. As a result, proper evidence must be used for determining the action to be taken in a given situation. In certain situations, a decision to perform an action is sent for approval to an expert. The evidence used for arriving at an answer is provided to the expert to allow the expert, for example, a specialist to quickly review the situation and the necessary facts. The action may represent approving or denying an insurance claim for a particular treatment for a person. The extraction of evidence provides the necessary information relevant to an answer for allowing the expert user to verify the decision made in a given situation. The techniques may also be used for legal research, for example, to determine based on evidence associated with a question and answer, whether certain law applies to a particular situation.

Additional Considerations Embodiments

It is to be understood that the Figures and descriptions of the present invention have been simplified to illustrate elements that are relevant for a clear understanding of the present invention, while eliminating, for the purpose of clarity, many other elements found in a multi-tenant system. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Some portions of the above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

We claim:

1. A computer-implemented method for making an evidence based decision for an action associated with a user, the computer-implemented method comprising:
   receiving information describing an action associated with the user, wherein the action associated with the user is a treatment request or claim filed relating to the user;
   receiving a set of documents associated with the user;
   receiving a plurality of questions associated with the action, wherein at least a subset of the plurality of questions represents domain specific guidelines or criteria that assist in making the decision and wherein the guidelines or criteria that assist in making the decision include guidelines or criteria for approving or denying the treatment request or claim of the user;
   for each of the plurality of questions:
      for each document from the set of documents:
         evaluating sentences of the document in relation to the question using an evidence extraction model, wherein the evidence extraction model is a trained neural network configured to receive as input a question and a potential evidence sentence and output a score indicating whether the input potential evidence sentence represents evidence relevant to the input question; and
         identifying a set of evidence sentences from the document based on the scores output by the evidence extraction model;
      classifying the set of evidence sentences in relation to the question using an evidence classification model, wherein the evidence classification model is a trained neural network configured to receive the input question and the set of evidence sentences as inputs to the evidence classification model and output a classification indicating whether the set of evidence sentences supports or refutes an answer to the input question; and
   making a decision regarding the treatment request or claim filed relating to the user based on the classifications of the sets of evidence sentences in relation to each of the plurality of questions.

2. The computer-implemented method of claim 1, wherein the classification output by the evidence extraction model further indicates whether the set of evidence sentences do not provide sufficient information to make a decision.

3. The computer-implemented method of claim 1, wherein the set of documents is a first set of documents and wherein receiving the set of documents comprises:
   receiving a second set of documents that is a super set of the first set of documents; and
   for each document from the second set of documents, providing the document and the question as input to a document ranking model, wherein the model is a trained neural network configured to receive as input a question and a document and output a score for ranking the document based on a likelihood that the document includes evidence related to the question.

4. The computer-implemented method of claim 3, further comprising:
   determining the first set as a subset of the second set of documents, the subset determined based on the scores predicted by the document ranking model.

5. The computer-implemented method of claim 1, wherein receiving the set of documents comprises:
   receiving a set of images; and
   performing optical character recognition on the images to extract the documents.

6. The computer-implemented method of claim 1, further comprising:
   determining where to route information describing the action based on the decision.

7. The computer-implemented method of claim 1, wherein one or more evidence sentences do not include any search keywords from the question.

8. The computer-implemented method of claim 1, wherein the evidence extraction model is a binary classifier that determines whether an input sentence represents evidence relevant to an input question.

9. The computer-implemented method of claim 1, wherein making the decision regarding the action comprises:
   aggregating results from different questions to determine an aggregate propensity score; and
   using the aggregate propensity score to predict the decision for the action.

10. A non-transitory computer readable storage medium storing instructions that when executed by a processor, cause the processor to perform steps for making an evidence based decision for an action associated with a user, the steps comprising:
   receiving information describing an action associated with the user, wherein the action associated with the user is a treatment request or claim filed relating to the user;
   receiving a set of documents associated with the user;
   receiving a plurality of questions associated with the action, wherein at least a subset of the plurality of questions represents domain specific guidelines or criteria that assist in making the decision and wherein the guidelines or criteria that assist in making the decision include guidelines or criteria for approving or denying the treatment request or claim of the user;
   for each of the plurality of questions:
      for each document from the set of documents:
         evaluating sentences of the document in relation to the question using an evidence extraction model, wherein the evidence extraction model is a trained neural network configured to receive as input a question and a potential evidence sentence and output a score indicating whether the input potential evidence sentence represents evidence relevant to the input question; and
identifying a set of evidence sentences from the document based on the scores output by the evidence extraction model;
classifying the set of evidence sentences in relation to the question using an evidence classification model, wherein the evidence classification model is a trained neural network configured to receive the input question and the set of evidence sentences as inputs to the evidence classification model and output a classification indicating whether the set of evidence sentences supports or refutes an answer to the input question; and
making a decision regarding the treatment request or claim filed relating to the user based on the classifications of the sets of evidence sentences in relation to each of the plurality of questions.

11. The non-transitory computer readable storage medium of claim 10, wherein the classification output by the evidence extraction model further indicates whether the set of evidence sentences do not provide sufficient information to make a decision.

12. The non-transitory computer readable storage medium of claim 10, wherein the set of documents is a first set of documents and wherein instructions for receiving the set of documents comprise instructions for:
receiving a second set of documents that is a super set of the first set of documents; and
for each document from the second set of documents, providing the document and the question as input to a document ranking model, wherein the model is a trained neural network configured to receive as input a question and a document and output a score for ranking the document based on a likelihood that the document includes evidence related to the question.

13. The non-transitory computer readable storage medium of claim 12, wherein the stored instructions when executed by the processor, further cause the processor to perform steps comprising:
determining the first set as a subset of the second set of documents, the subset determined based on the scores predicted by the document ranking model.

14. The non-transitory computer readable storage medium of claim 10, wherein the stored instructions when executed by the processor, further cause the processor to perform steps comprising:
determining where to route information describing the action based on the decision.

15. The non-transitory computer readable storage medium of claim 10, wherein the evidence extraction model is a binary classifier that determines whether an input sentence represents evidence relevant to an input question.

16. The non-transitory computer readable storage medium of claim 10, wherein instructions for making the decision regarding the action cause the processor to perform steps comprising:
aggregating results from different questions to determine an aggregate propensity score; and
using the aggregate propensity score to predict the decision for the action.

17. A computer system comprising:
one or more computer processors; and
a non-transitory computer readable storage medium storing instructions that when executed by a processor, cause the processor to perform steps for making an evidence based decision for an action associated with a user, the steps comprising:
receiving information describing an action associated with the user, wherein the action associated with the user is a treatment request or claim filed relating to the user;
receiving a set of documents associated with the user;
receiving a plurality of questions associated with the action, wherein at least a subset of the plurality of questions represents domain specific guidelines or criteria that assist in making the decision and wherein the guidelines or criteria that assist in making the decision include guidelines or criteria for approving or denying the treatment request or claim of the user;
for each of the plurality of questions:
for each document from the set of documents:
evaluating sentences of the document in relation to the question using an evidence extraction model, wherein the evidence extraction model is a trained neural network configured to receive as input a question and a potential evidence sentence and output a score indicating whether the input potential evidence sentence represents evidence relevant to the input question; and
identifying a set of evidence sentences from the document based on the scores output by the evidence extraction model;
classifying the set of evidence sentences in relation to the question using an evidence classification model, wherein the evidence classification model is a trained neural network configured to receive the input question and the set of evidence sentences as inputs to the evidence classification model and output a classification indicating whether the set of evidence sentences supports or refutes an answer to the input question; and
making a decision regarding the treatment request or claim filed relating to the user based on the classifications of the sets of evidence sentences in relation to each of the plurality of questions.

18. The computer system of claim 17, wherein the set of documents is a first set of documents and wherein instructions for receiving the set of documents comprise instructions for:
receiving a second set of documents that is a super set of the first set of documents;
for each document from the second set of documents, providing the document and the question as input to a document ranking model, wherein the model is a trained neural network configured to receive as input a question and a document and output a score for ranking the document based on a likelihood that the document includes evidence related to the question; and
determining the first set as a subset of the second set of documents, the subset determined based on the scores predicted by the document ranking model.

19. The computer system of claim 17, wherein the stored instructions when executed by the processor, further cause the processor to perform steps comprising:
determining where to route information describing the action based on the decision.

20. The computer system of claim 17, wherein instructions for making the decision regarding the action cause the processor to perform steps comprising:

aggregating results from different questions to determine an aggregate propensity score; and using the aggregate propensity score to predict the decision for the action.

* * * * *